Aug. 30, 1932.  P. S. COMBS, JR  1,874,907
MONORAIL CAR
Filed Dec. 1, 1930   2 Sheets-Sheet 1

INVENTOR
*Presley Stuart Combs Jr.*
BY
*Westall and Wallace*
ATTORNEYS

Aug. 30, 1932.   P. S. COMBS, JR   1,874,907
MONORAIL CAR
Filed Dec. 1, 1930   2 Sheets-Sheet 2
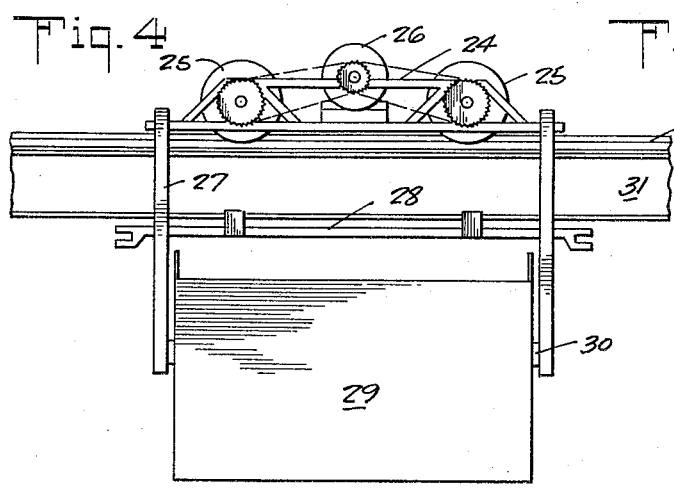
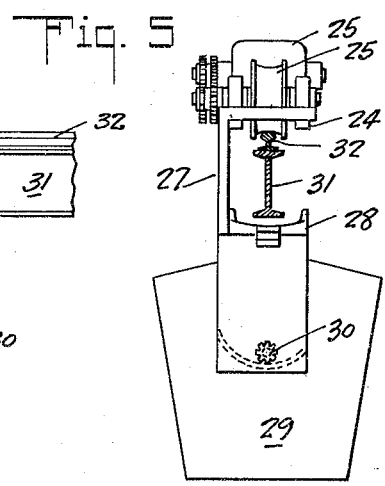
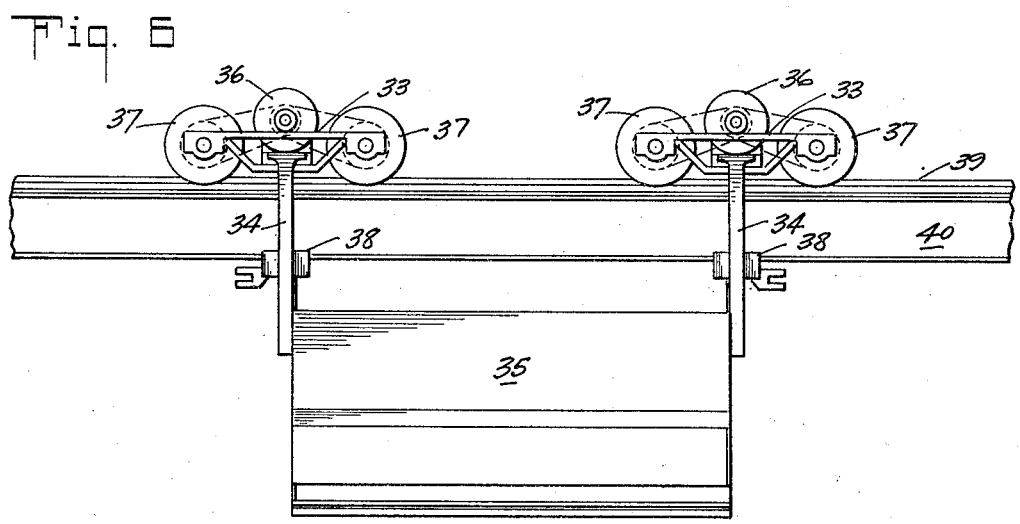
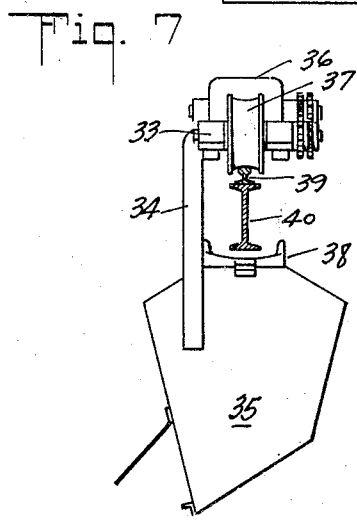
INVENTOR
Presley Stuart Combs Jr.
BY
Westall and Wallace
ATTORNEYS Patented Aug. 30, 1932

1,874,907

UNITED STATES PATENT OFFICE

PRESLEY STUART COMBS, JR., OF LOS ANGELES, CALIFORNIA

MONORAIL CAR

Application filed December 1, 1930. Serial No. 499,159.

This invention relates to a monorail railway having a suspended car and pertains particularly to the truck and car or load carrier mounted on the rail. Such suspended cars are commonly free to swing laterally, and, if swung far enough, are liable to derailment. This is especially true when the car passes around a curve at a relatively high speed. The present invention appertains particularly to means to prevent such derailment.

The objects of this invention are to provide a keeper which is opposed to the wheel and permits swaying of the car but restrains the wheel against movement off the track.

These objects together with other objects and corresponding accomplishments are obtained by means of the embodiment of my invention illustrated in the accompanying drawings, in which:—

Figure 1:
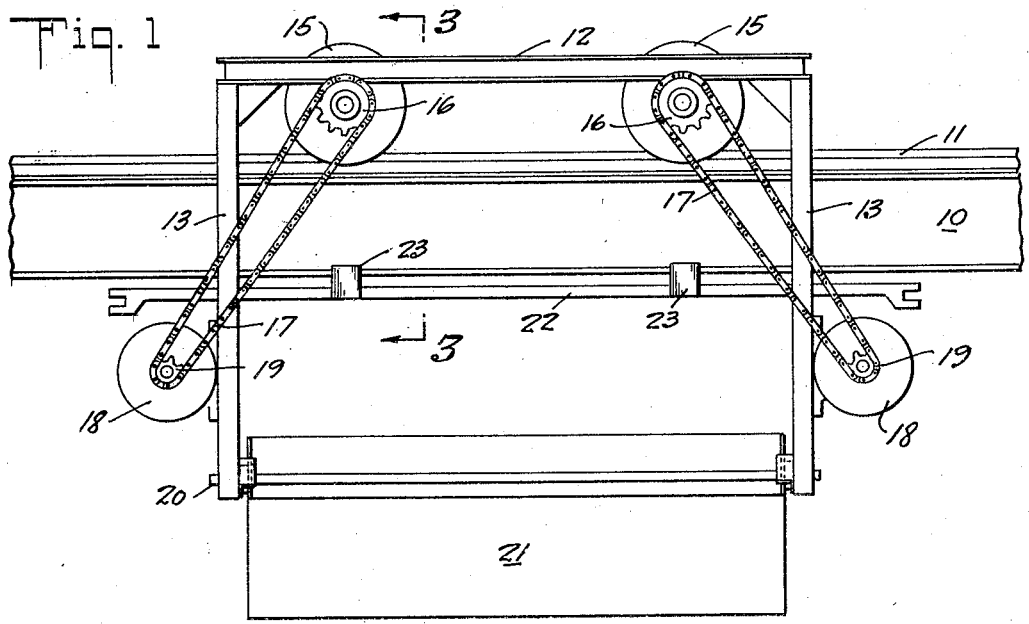
Figure 2:
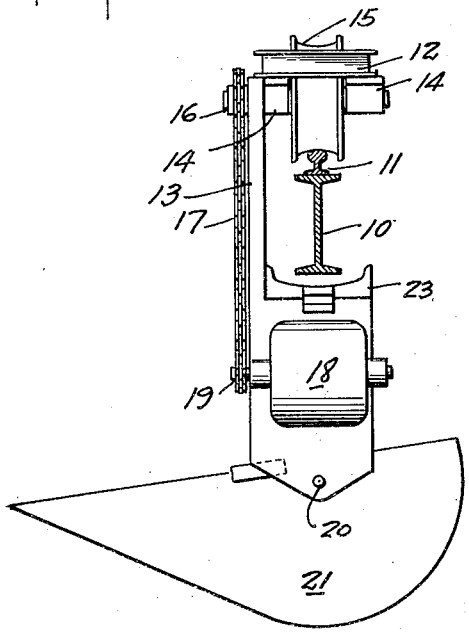
Figure 3:
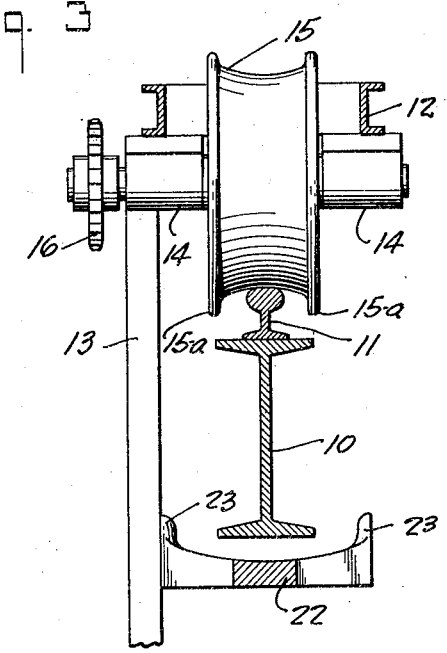

Figs. 1, 2 and 3 illustrate one form of the invention; Figs. 4 and 5 show another form of the invention; and Figs. 6 and 7 show still another form. Fig. 1 is a side elevation; Fig. 2 is an end elevation; Fig. 3 is a fragmentary section as seen on the line 3—3 of Fig. 1; Fig. 4 is a side elevation; Fig. 5 is an end elevation; Fig. 6 is a side elevation; and Fig. 7 an end elevation.

Referring more particularly to Figs. 1, 2, and 3, a beam or tower, not shown, supports a track 10 enabling a monorail car truck to be suspended thereon. On the upper side of this rail beam is a ball rail 11 of suitable design for the traction wheels of the truck to ride thereon. A truck frame 12 has hangers 13 to support the carrier and upon which a keeper is mounted. Journalled in bearings 14 on the under side of the truck frame 12 are the axles of traction wheels 15. There are two traction wheels shown, each of which serves as a drive wheel, the axles of wheels 15 having sprocket wheels 16 meshed with chains 17 which are driven by motors 18 having pinions 19 geared to chains 17. Supported on trunnions 20 in hangers 13 is a load container or carrier 21 hung in such a manner that the load may be dumped by tilting the container. Underhanging the beam is a keeper 22. This keeper may be an element separate from the hangers so as to be adjustable as to height. Referring more particularly to Fig. 3, it will be noted that the depth of the flanges 15a of wheels 15 is slightly greater than the distance from the bottom of track beam 8 to the keeper 22. The top surface or face of keeper 22 is transversely curved, the radius of the curve being the distance from the face of keeper 22 to the lower face of wheel 15 so that when the car is in a position other than perpendicular, the relative distance between the track beam and the keeper is the same.

On the keeper and upstanding therefrom are rounded projections 23 whose purpose is to place a limit upon the side swing or sway of the car and to prevent catching on beam joints. It is obvious the rollers may be used instead of the rounded projections. These projections are shown integral with the keeper. However, they may be in the form of a shoe supported by a spring in such manner as to absorb part of the shock of contact between the shoe and the beam.

Referring more particularly to Figs. 4 and 5, a truck frame 24 is shown having traction wheels 25 driven from a single motor 26 mounted on the truck. Hangers 27 have a keeper 28 mounted thereon, which keeper is substantially of the same character as that before described. A carrier for loads is marked 29 and is supported on the hangers by trunnions 30. The carrier 29 may be swung and a pinion is shown which may be geared to any suitable mechanism for turning the pinion, such mechanism not being shown. Track beam 31 has a ball rail 32. The operation is obvious.

In Figs. 6 and 7, a rigid structure is shown comprising two trucks 33 each having hangers 34 secured to a carrier 35 so that a unit is formed. As shown, each truck has mounted thereon a motor 36 for driving traction wheels 37 arranged in tandem. Keepers 38 cooperate with wheels 37 to prevent derailment from rail 39 mounted on beam 40.

It will be apparent, that although tractor cars are shown, the invention is adapted for trailers having no motor drive. The invention resides particularly in the traction wheels, rail, rail support and keeper as claimed hereinafter. The matter of the position of the motor or motors in the tractor type shown is determined to properly position weight.

What I claim is:—

1. In combination with an overhung track having a rail, a suspended monorail load carrier, a truck suspending said car; said truck including a truck frame having a set of traction wheels riding on said rail and a keeper underhanging said track, said wheels and keeper being spaced to permit swaying of the car but prevent derailment, said keeper having upstanding rounded longitudinal side projections to limit the degree of sway.

2. In combination with an overhung track having a ball rail, a suspended monorail load carrier, a truck suspending said load carrier; said truck including a truck frame having a set of traction wheels riding on said rail and a keeper underhanging said track, said wheels and keeper being spaced to permit swaying of the car but prevent derailment, said keeper having a curved face to maintain constant the clearance between keeper and track and having upstanding rounded longitudinal side projections to limit the degree of sway.

In witness that I claim the foregoing I have hereunto subscribed my name this 25th day of October, 1930.

PRESLEY STUART COMBS, Jr.